March 10, 1953  E. S. GANDRUD  2,630,945
SPREADER FOR FERTILIZER, SEEDS, AND THE LIKE
HAVING REMOVABLE HOPPER BOTTOM PORTION
Filed Sept. 9, 1946  2 SHEETS—SHEET 1
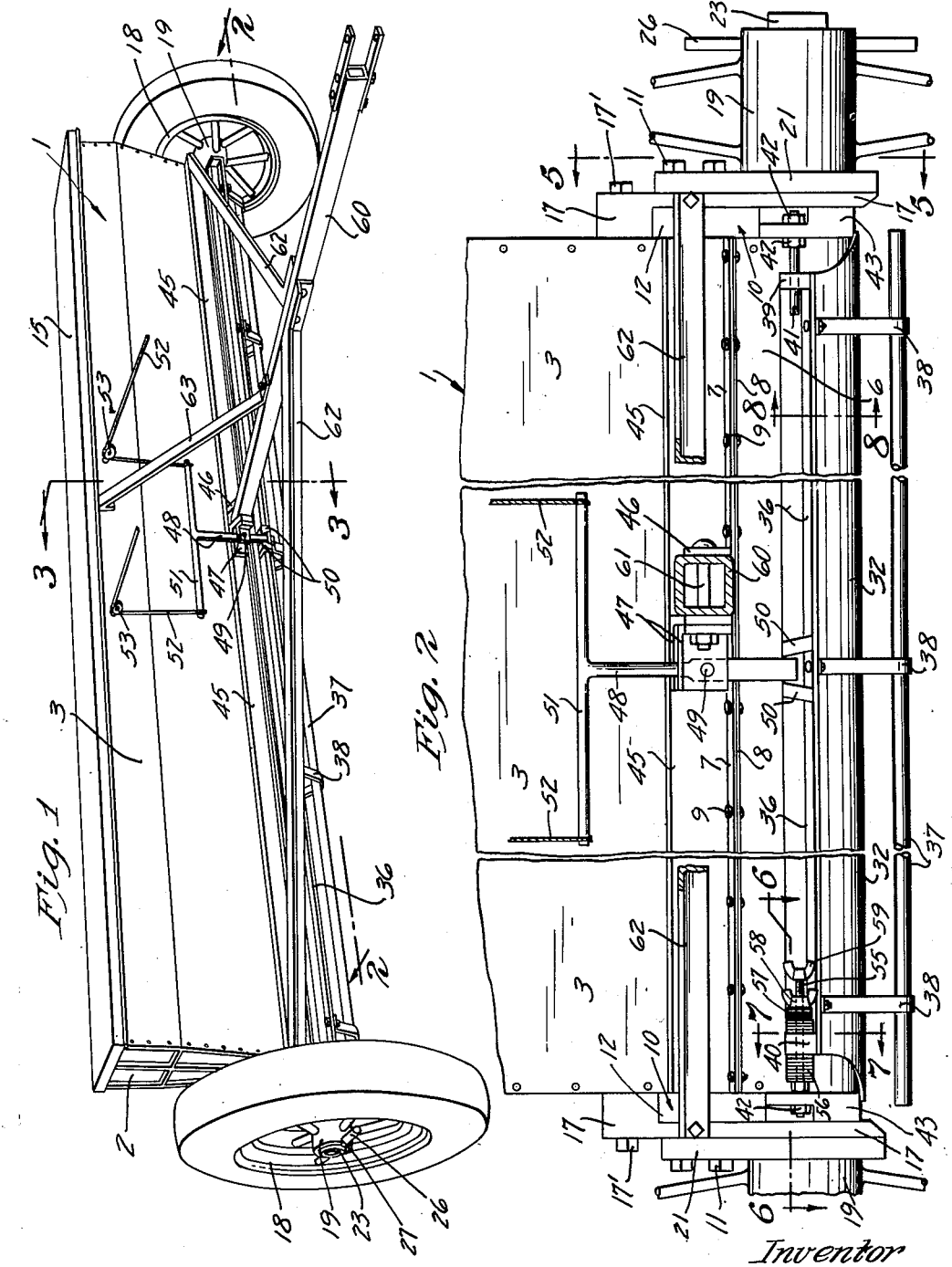
Inventor
Ebenhard S. Gandrud
By his Attorneys
Merchant & Merchant

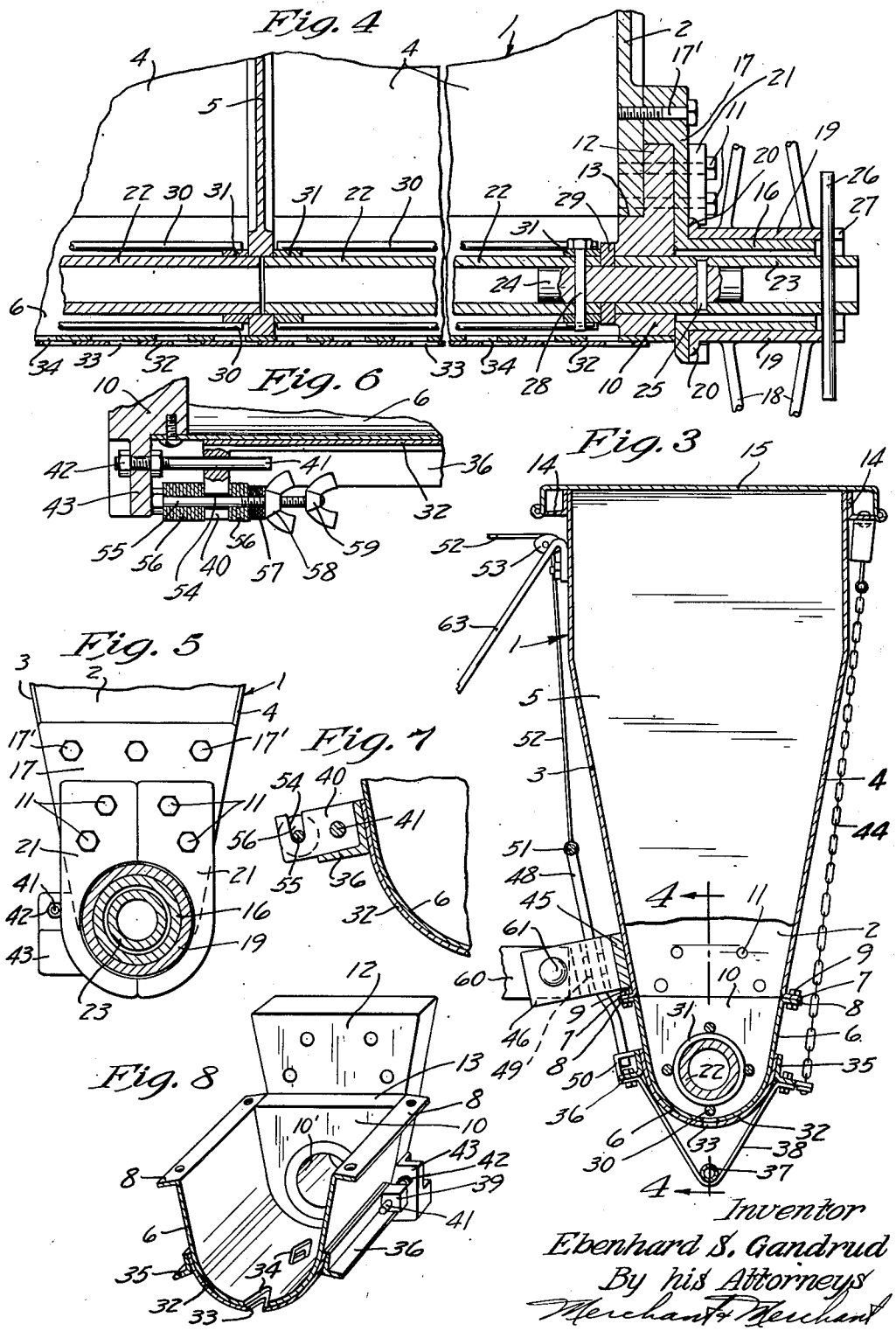

Patented Mar. 10, 1953

2,630,945

UNITED STATES PATENT OFFICE 2,630,945

SPREADER FOR FERTILIZER, SEEDS, AND THE LIKE HAVING REMOVABLE HOPPER BOTTOM PORTION

Ebenhard S. Gandrud, Owatonna, Minn.

Application September 9, 1946, Serial No. 695,597

2 Claims. (Cl. 222—177)

My present invention provides a simple and highly efficient machine for broadcasting and evenly distributing dry granular fertilizer, seeds, and the like, and is in the nature of an improvement upon the structure of my Patent 2,350,107.

The primary object of my invention is the provision of a hopper with a removable bottom which can be removed or separated from the remaining mechanism with a minimum amount of time and effort in order to facilitate replacement or repair thereof and while the main hopper structure is supported on its ground engaging wheels.

Other features of the machine herein disclosed are claimed in a divisional application filed by me on August 1, 1952, under Serial No. 302,205.

The above and still further objects of my invention will become apparent from the following detailed specification, appended claims and attached drawings.

Referring to the drawings wherein like characters indicate like parts throughout the several views:

Fig. 1 is a view in perspective showing the improved spreader looking at the same from the front toward the rear;

Fig. 2 is a view partly in vertical section and partly in front elevation taken substantially on the line 2—2 of Fig. 1, some parts being broken away;

Fig. 3 is a vertical section taken on the line 3—3 of Fig. 1, some parts being broken away;

Fig. 4 is a fragmentary section taken on the line 4—4 of Fig. 3;

Fig. 5 is a vertical section taken on the line 5—5 of Fig. 2, some parts being broken away;

Fig. 6 is a fragmentary section taken on the line 6—6 of Fig. 2;

Fig. 7 is a fragmentary vertical section taken on the line 7—7 of Fig. 2; and

Fig. 8 is a fragmentary view in perspective, some parts being sect'oned on the line 8—8 of Fig. 2, and some parts being removed.

My spreader involves a main open bottom hopper or receptacle section 1 having end walls 2, front and rear walls 3 and 4, respectively, an intermediate wall 5, and a U-shaped supplemental hopper bottom section 6. The front and rear walls 3 and 4, at the lower edges of the open bottom hopper section 1, are formed to provide flanges 7 which engage flanges 8 of the hopper bottom section 6 and are separably secured thereto by nut-equipped bolts or the like 9. At its ends, the hopper bottom 6 is provided with end wall bearing plates 10 which are secured to the end walls 2 of the main hopper section by means of bolts 11. It will be seen in Fig. 4 that the end walls 2 of the main hopper section extend downwardly to adjacent the flanges 7 of the front and rear walls 3 and 4, and that the bearing plates 10 of the hopper bottom section 6 are provided with upwardly extending flanges 12 that engage the outer side of the end walls 2, and with a flat shelf or shoulder 13 which engages the bottom edge portion of the end walls 2. At its top, the main hopper 1 is reinforced by angle irons 14 and is provided with a removable cover 15.

Axially aligned with openings 10' in the end wall bearing plates 10 of the supplemental bottom hopper section 6 are wheel supporting trunnions 16. These trunnions 16 have plate-like flanges 17 rigidly secured to the lower end portions of the end walls 2 of the hopper section 1 by threaded bolts 17' so as to extend below said end walls and provide a supplemental bottom section receiving space between said trunnions and below the open bottom of the main hopper section.

The spreader is mounted on a pair of axially-spaced ground engaging wheels 18 which may be of any suitable form, but, as shown, are provided with hubs 19 journalled on the respective trunnions 16 and provided at their inner ends with outstanding flanges 20. The flanges 20 are engaged by divided retaining plates 21 that permit free rotation of the wheels but hold the same against axial displacement from their respective trunnions. It will be seen, particularly in Figs. 4 and 5, that the bolts 11 pass through the retaining plates 21, the flange 17, and the upwardly extended flange 12 of the bearing plate 10 to effectively secure the same to the end wall 2.

At its transversely central portion, the hopper 1 is divided by the intermediate wall 5 into two compartments. Agitator shafts 22 that are preferably tubular, are, at their inner ends, telescoped into and journalled within a seat formed in the lower portion of the intermediate wall 5. Axially aligned with the agitator shafts 22 and journalled in the openings 10' of the bearing plates 10 are wheel-driven stub shafts 23. These shafts 23, as shown, are tubular and are provided with diametrically reduced portions 24 shown as formed by a short shaft section rigidly secured therein by suitable means, such as a pin 25. At their outer ends, the wheel-driven stub shafts 23 are provided with diametrically projecting pins 26 that engage notches 27 in the wheel hubs 19 and cause the wheels 18 to drive the said stub shafts.

The reduced portions 24 of the stub shafts 23 are telescoped into the outer ends of the respective tubular shafts 22 and are connected thereto for rotation therewith by suitable detachable means, such as bolts or pins 28. On the reduced end portions 24 of the stub shafts 23 are spacing washers 29 that are normally engaged between the outer ends of the agitator shafts 22 and the inner faces of the bearing plates 10. These spacing washers 29 are of such width that when applied, as shown in Fig. 4, they will hold the inner ends of the agitator shafts seated in the intermediate wall 5.

The agitator shafts 22 carry circumferentially-spaced longitudinally-extended agitator bars or rods 30. The agitator rods 30 are spaced from their respective shafts 22, but secured thereto at their ends by spacing rings 31. The agitator rods 30 are arranged to run in close engagement, but always out of contact with the bottom of the removable portion 6.

A valve-acting gate 32 fits against the concave bottom 6 of the hopper and is provided with diamond-shaped discharge passages 33 that correspond in form and spacing to discharge passages 34 in the bottom 6 and are adapted to be moved more or less into registration with the discharge passages 34 of the bottom 6 or to be moved entirely out of registration therewith. The upper edges of the valve-acting gate 32 are reinforced by angle bars 35 and 36 rigidly secured thereto by welding, riveting, or otherwise. A scatter rod 37 is located directly below the discharge passages of the hopper bottom 6 and the gate 32 and is supported by hanger brackets 38 bolted to the angle bars 35 and 36.

At its ends, the angle bar 36 is provided with lugs 39 and 40 which are bored to slidably and rotatively engage hinge pins 41. These hinge pins 41 are threaded at one end and are secured by nuts 42 to brackets 43 laterally extending from the bearing plates 10, see particularly Figs. 2, 5, 6 and 8. Hinge pins 41 are axially aligned, and pivotally and slidably support the gate 32 at one side thereof. At its other side, the gate 32 is supported and held in close engagement with the hopper bottom 6 by a suspended link chain 44 anchored at its other end to the angle bar 14, and removably secured at its lower end to the angle bar 35, all as fully disclosed in my prior Patent 2,350,107. By the means just described, the gate 32 will be normally held in close contact with the bottom 6 of the hopper and the suspending chain 44 will swing and permit sliding adjustments of said gate.

Rigidly secured to the front wall 3 of the hopper 1 and reinforcing the same is a heavy flat metal bar 45 to the intermediate portion of which latter is rigidly secured lugs or brackets 46 and 47.

For shifting of the valve-acting gate 32, there is provided a shift lever 48 pivoted at 49 to the lugs 47. The lower end of this lever 48 engages between lugs 50 rigidly secured to the bar 36 of the gate 32 as best shown in Figs. 2 and 3. The upper end of the shift lever 48 is formed to provide a cross bar 51 extending longitudinally of the hopper. A pair of cables 52 have one end each thereof fastened to respective ends of the cross bar 51 and pass over pulleys 53 secured near the top of the front wall 3 of the hopper from whence said cables 52 extend forwardly to a tractor or other pulling means, not shown. With this arrangement, the operator may shift the gate 32 to start or stop flow of material from the hopper without having to stop forward travel of the spreader or leaving his seat on the tractor.

For controlling the limits to which the flow of material can be regulated, that is, for determining the size of the openings in the bottom of the hopper, I provide novel means as follows: an upwardly opening slot 54 in the lug 40 of the gate 32 is adapted to receive an adjustable spacing device comprising a headed bolt 55, relatively thick spacing washers 56, relatively thin spacing washers 57, and locking nuts 58 and 59. As seen in Figs. 2 and 6, the head of the bolt 55, when the hopper bottom is open for delivery of material therethrough, rests against the bracket 43. The size of the openings in the hopper bottom formed by the overlapping diamond-shaped passages 33 and 34 is determined by the number of washers 56 and 57 on the bolt 55 between the lug 40 and the nut 58. In other words, the length of each of the openings in the bottom of the hopper is identical to the combined thickness of the washers between the lug 40 and the nut 58. It is obvious that when fine-grained material is fed through the hopper bottom that finer adjustment of the openings in the bottom is necessary; hence, the reason for the relatively thin washers 57. The nut 59 is soldered or otherwise rigidly secured to the end of the threaded bolt 55 for convenience in handling and tightening the device upon the machine. Adjustment is made merely by loosening the nut 58, bodily lifting the whole device from the slot 54, retaining the necessary number of washers adjacent the nut 58, reinserting the device into the slot 54 and tightening of the nut 58. This arrangement forms at once a positive stop and a visual gage.

The spreader is adapted to be pulled or pushed by any suitable means, but, as shown, is adapted to be connected to a tractor or other vehicle and pulled forward through a draw bar 60, the rear end of which, by a bolt 61, is attached to the lugs 46 and 47 of the reinforcing bar 45. The draw bar 60 is further connected to the hopper 1 by oblique braced angles or bars 62 and a brace bar or strap 63. The outer ends of the braces 62 are shown as attached to the flanges 17 of the trunnions 16, and the upper end of the strap 63 is shown as attached to the front wall 3 of the hopper 1 near the top or adjacent the top thereof.

It has been found that foreign matter, such as a sharp stone inadvertently admitted to the hopper, will, when reaching the agitator, be rubbed against the hopper bottom with enough force to damage the bottom to the extent that sliding action of the gate 32 is prevented, or one or more of the openings in the bottom 6 may be gouged out of shape resulting in an uneven flow of material from the hopper. When this occurs, it is often impossible to repair the damage, so that a new hopper and sliding gage is required. My present invention, in providing a removable hopper bottom and gate assembly, makes a repair to the hopper a relatively inexpensive and easily accomplished operation.

To remove the hopper bottom and gate, the bolts or pins 28 are removed from the agitator shaft 22. The stub shafts 23 are then withdrawn and the washers 29 lifted out of the hopper. The agitators may then be also removed from the hopper. Next, the removable lower end of the chain 44 is disengaged from the sliding gate 32 and the nut-equipped bolts 9 removed from the flanges 7 and 8. The bolts 11 are then removed allowing the hopper bottom 6, and the plate 10, and gate 32 to drop away and a new bottom assembly to be applied. It will be noted, that during this time, the main hopper section 1 is supported by the ground engaging wheels 18 on the trunnions 16 through the flange 17 and bolts 17' threaded into the end walls 2 of said hopper section.

The spreading operation of the machine is identical to the spreader of my prior Patent 2,350,107 and has been fully described therein.

While I have disclosed a preferred or commercial form of my improved machine, it will be understood that various modifications and adaptations of the machine may be made all within the scope of the invention here disclosed and defined in the claims.

What I claim is:

1. In a machine for distributing granular materials, a horizontally elongated main hopper section having connected front, rear and end walls and an open bottom, cylindrical trunnions disposed below said open bottom and connected to the lower end portions of said end walls with their axes aligned, thereby providing a supplemental bottom section receiving space between said trunnions and below the open bottom of the main hopper section, ground engaging wheels rotatably mounted on said trunnions outwardly of said end walls, a supplemental bottom hopper section having front, rear and end walls and a perforated bottom wall removably disposed within said space, means at the juncture of the main and supplemental sections for rigidly and separably securing said sections together with the respective lower and upper edges of the front, rear and end walls thereof in adjacency, an elongated rotary agitator located in the bottom hopper section, stub shaft members detachably connected at their opposite ends to said ground wheels and said rotary agitator respectively and being rotatably and slidably supported intermediate their ends in apertures in the end walls of said bottom hopper section, whereby upon release of said securing means and the inner ends of said stub shafts from said agitator and axial displacement thereof through the apertures in said end walls, said hopper bottom section may be readily removed from said space while the main hopper section is supported on said ground engaging wheels.

2. The structure defined in claim 1, wherein the end walls of the supplemental bottom hopper section comprise bearing members rotatably receiving the intermediate portions of the stub shaft members.

EBENHARD S. GANDRUD.

REFERENCES CITED

The following references are of record in the file of this patent:

UNITED STATES PATENTS

| Number | Name | Date |
|---|---|---|
| 35,636 | Thomas | June 17, 1862 |
| 285,711 | Watkins | Sept. 25, 1883 |
| 348,755 | Mackey | Sept. 7, 1886 |
| 1,294,512 | Michaud | Feb. 18, 1919 |
| 1,426,671 | Printz | Aug. 22, 1922 |
| 1,466,398 | Holadia | Aug. 28, 1923 |
| 1,491,100 | Hoke | Apr. 22, 1924 |
| 1,609,643 | Daly | Dec. 7, 1926 |
| 2,190,863 | Dance | Feb. 20, 1940 |
| 2,334,376 | Bauer | Nov. 16, 1943 |
| 2,350,107 | Gandrud | May 30, 1944 |
| 2,533,386 | Masters | Dec. 12, 1950 |
| 2,541,008 | Stahmer | Feb. 6, 1951 |